United States Patent
Shintoku

(10) Patent No.: US 8,395,787 B2
(45) Date of Patent: Mar. 12, 2013

(54) INFORMATION PROCESSING APPARATUS HAVING CUSTOMIZED DRIVER, METHOD OF CONTROLLING THE SAME, AND MEDIUM STORING CONTROL PROGRAM

(75) Inventor: Hiroshi Shintoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1198 days.

(21) Appl. No.: 11/350,452

(22) Filed: Feb. 9, 2006

(65) Prior Publication Data

US 2006/0176499 A1 Aug. 10, 2006

(30) Foreign Application Priority Data

Feb. 10, 2005 (JP) .................. 2005-034587

(51) Int. Cl.
G06F 3/12 (2006.01)
(52) U.S. Cl. ....... 358/1.13; 358/1.15; 717/168; 717/174
(58) Field of Classification Search .......... 358/1.1–1.16; 719/321, 327
See application file for complete search history.

(56) References Cited

U.S. PATENT DOCUMENTS 6,825,941 B1* 11/2004 Nguyen et al. ............... 358/1.15
6,847,466 B1* 1/2005 Gazdik et al. ................ 358/1.15
2003/0063305 A1* 4/2003 McIntyre ..................... 358/1.13
2003/0079063 A1 4/2003 Iida et al.
2005/0157321 A1* 7/2005 Alacar ......................... 358/1.13

FOREIGN PATENT DOCUMENTS

JP 2003-131832 A 5/2003
JP 2003-208276 A 7/2003

OTHER PUBLICATIONS

Apr. 7, 2009 Japanese Office Action that issued in Japanese Patent Application No. 2005-034587, which is not enclosed.
Jan. 5, 2010 Japanese Office Action, which is not enclosed, that issued in Japanese Patent Application No. 2005-034587.

* cited by examiner

Primary Examiner — Benny Q Tieu
Assistant Examiner — Michael Y Tzeng
(74) Attorney, Agent, or Firm — Cowan, Liebowitz & Latman, P.C.

(57) ABSTRACT

An information processing method carried out in an information processing apparatus having a driver program which has previously been installed, and an installation set including a driver program to be customized and an installer, comprises specifying expansion print setting from print settings set in the driver program which has previously been installed, obtaining the specified expansion print setting, and holding the obtained expansion print setting as the installation set.

16 Claims, 12 Drawing Sheets

FIG. 11

- CUSTOM INSTALLER EXECUTING MODULE ~ W01
  (*.EXE, ETC.)
- SETTING FILE FOR CUSTOM INSTALLER ~ W02
- PRINTER DRIVER ~ W03

FIG. 12

[ModelName] ~ X01
NetworkPrinter A

[IPAddress] ~ X02
192.*.*.111

[DriverName] ~ X03
NWPrinterDriver A

[CIP_Module]
Install=1
Name=PrinterA.CIP

[UDG_Module]
Install=1
Name=PrinterA.UDG

[Profile_Module]
Install=1
Name=PrinterProfile.dat

~ X04

INFORMATION PROCESSING APPARATUS HAVING CUSTOMIZED DRIVER, METHOD OF CONTROLLING THE SAME, AND MEDIUM STORING CONTROL PROGRAM

BACKGROUND OF THE INVENTION

1. Field of the Invention

The invention relates to a printer driver, its related program, an apparatus, and a system.

2. Related Background Art

Hitherto, it is possible to search for a printer which is operating on a network, set an IP address, and install its information into a PC of the user (refer to Japanese Patent Application Laid-open No. 2004-220452, Japanese Patent Application Laid-open No. 2004-74458).

In those conventional techniques, a technique in which the network printer is set so that it can be used in an environment of the user has been mentioned. However, a technique regarding installation of a customized driver and creation and setting of an installer unit which performed the customization is not mentioned.

Further, a technique for allowing another driver to succeed to the installed print setting is being developed. However, the print setting expanded after the installation cannot be succeeded to as a new print environment from a printer driver having the print setting to which the user wants to succeed.

Further, a technique in which expansion print setting which is used in an existing print environment, a driver program, and an installer are made to correspond to each other and constructed as a customized installation set does not exist either.

SUMMARY OF THE INVENTION

The invention is made in consideration of at least one of the above problems and it is an object of the invention to enable the user to install a printer driver whose print setting has been expanded by a simple method.

Another object of the invention is to enable the operation necessary for forming a print environment having expansion print setting to be executed without any special knowledge.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a diagram showing an example of a construction of a module of the custom installer in the embodiment;

FIG. 12 is a diagram showing an example of a setting file for the custom installer shown in FIG. 5;

DETAILED DESCRIPTION OF THE PREFERRED EMBODIMENTS

Figure 2:
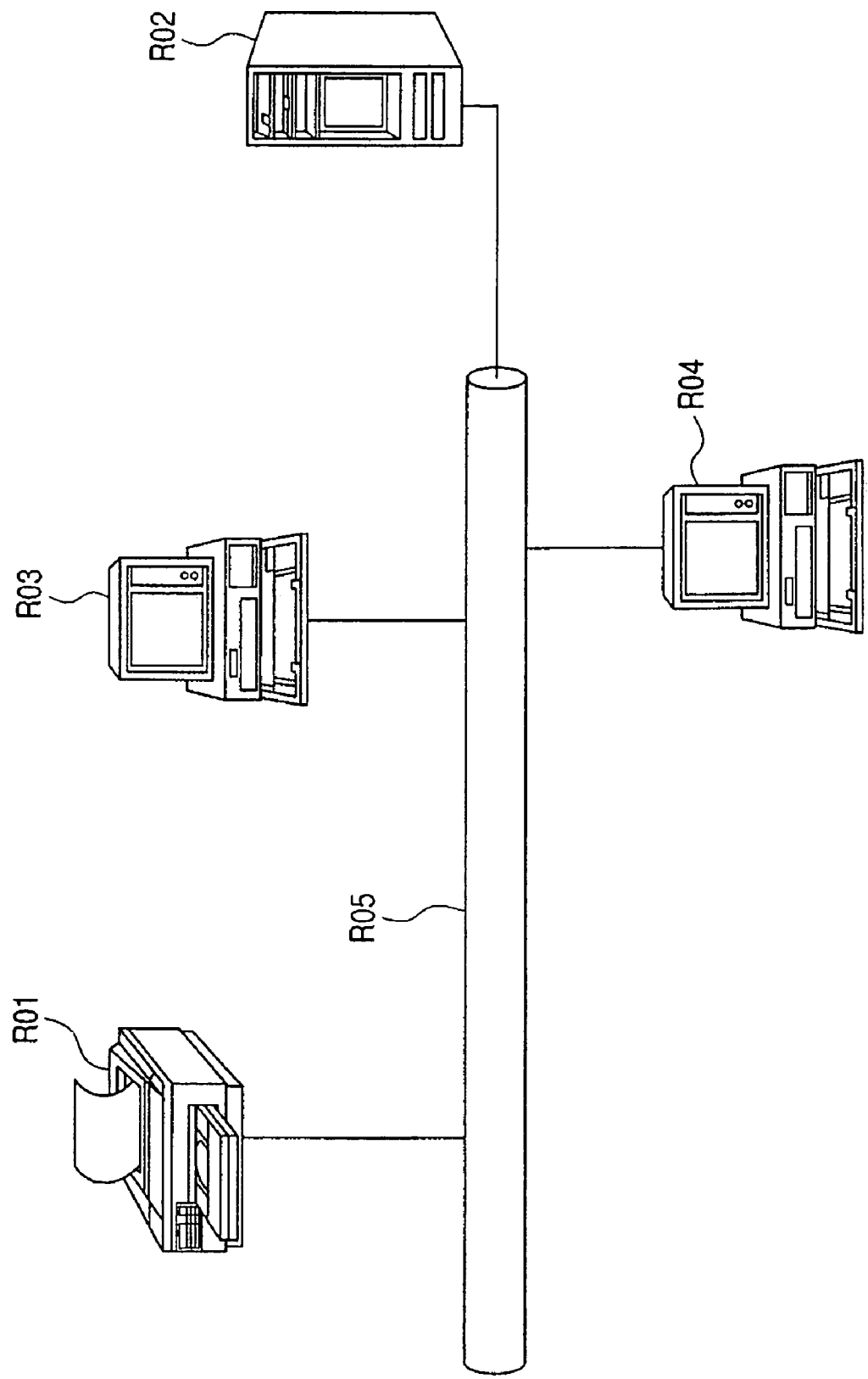
FIG. 2 is a diagram showing an example of a network environment including the information processing apparatus in the embodiment of the invention.

A best mode for carrying out the invention will be described hereinbelow with reference to the drawings. An information processing apparatus in an embodiment of the invention will be described. FIG. 2 is a diagram showing an example of a network environment including the information processing apparatus in the embodiment of the invention.
[Embodiment]

Figure 1:
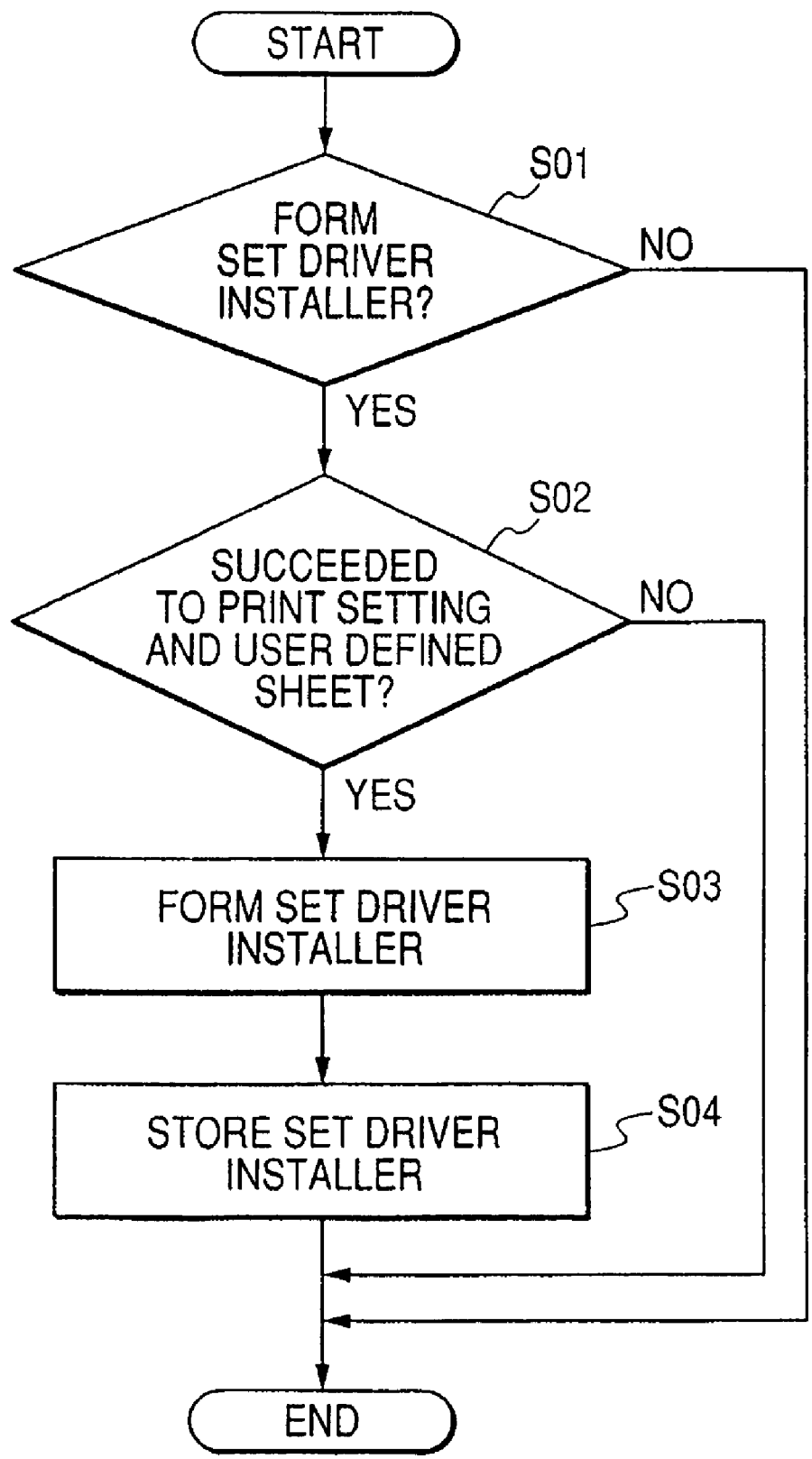
FIG. 1 is a flowchart showing an installing process of a printer driver which is executed by an information processing apparatus in an embodiment of the invention.

FIG. 1 is a flowchart showing the operation of software for forming a custom installer in the embodiment 1 of the invention.

Figure 3:
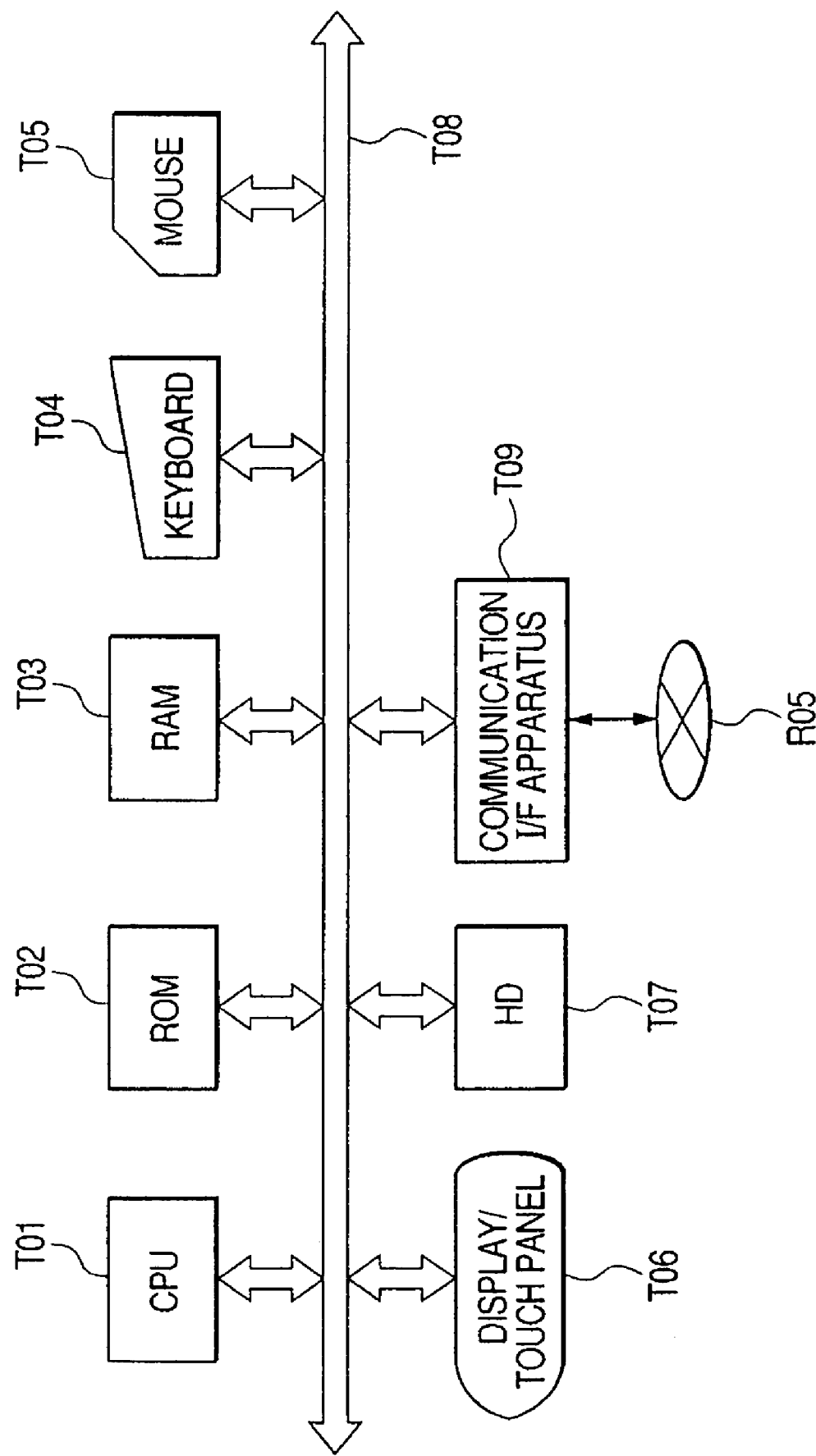
FIG. 3 is a diagram showing an example of a hardware construction of a PC (personal computer) R03 shown in FIG. 2.

FIG. 2 shows the example of the network environment where the installer is used. R01 denotes a printer as an installer forming target; R02 a server such as a DHCP; R03 a personal computer (PC) of a printer administrator (the user of the custom printer driver); and R04 a user PC. FIG. 3 is a block diagram showing an example of a hardware environment of the computer R03 to form the custom installer by executing such software. Each of R02, R03, and R04 similarly has hardware functions shown in FIG. 3.

In the diagram, T01 denotes a central arithmetic operation processing unit (CPU) for an arithmetic operation and control; T03 a RAM in which an executing area where an installer program is loaded and a work area of the program are held in the case where the custom installation is executed; T04 a keyboard having keys which are used for the operator to execute the operation or input data; T05 a pointing device such as a mouse or the like which is used for the operator to click buttons or the like displayed on a display T06 or instruct the operation by moving a cursor; T07 a storage device (hard disk (HD)) for storing the software of the invention and the formed custom installer; and T08 a bus for mutually connecting devices in an executing system.

In FIG. 1, for example, it is assumed that a printer is connected to a network and used by a printer administrator in a general network environment (for example, FIG. 2). It is also assumed that print settings (including print setting, a user defined sheet, user defined media, etc.) which have been customized for the printer driver are used in the PC of the administrator. When the software is activated and started by instructing by clicking an icon or the like, a selecting display screen for allowing the operator to select whether or not a custom installer which can install the driver which succeeded to the customized settings and functions is formed is displayed in step S01. If the user's input indicates the creation of the set driver installer, S02 follows. In S02, a desired driver is selected from the installed target drivers. An input display screen for allowing the operator to select whether or not the print settings (including the print setting, user defined sheet, user defined media, etc.) are succeeded to is displayed on the display screen. If the user's input made on the display screen indicates the succession to the print settings, those settings are succeeded to and the driver installer is formed in S03. After that, the set driver installer formed in S03 is stored in S04. If the user's input made on the displayed input display screen indicates that the print settings are not succeeded to in S02, a default setting driver installer is formed.

Figure 4:
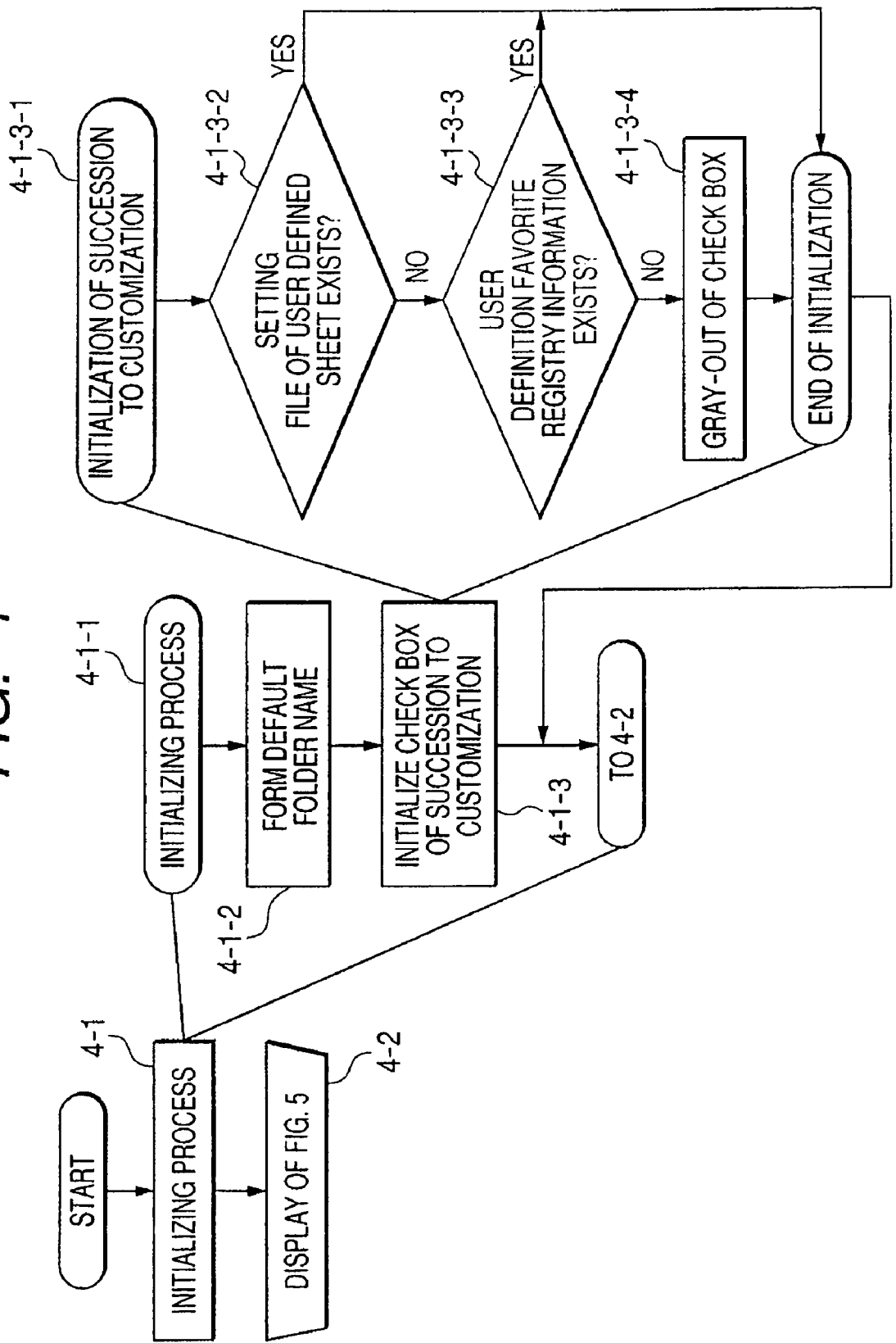
FIG. 4 is a diagram showing an example of an installer forming program in the embodiment.
Figure 5:
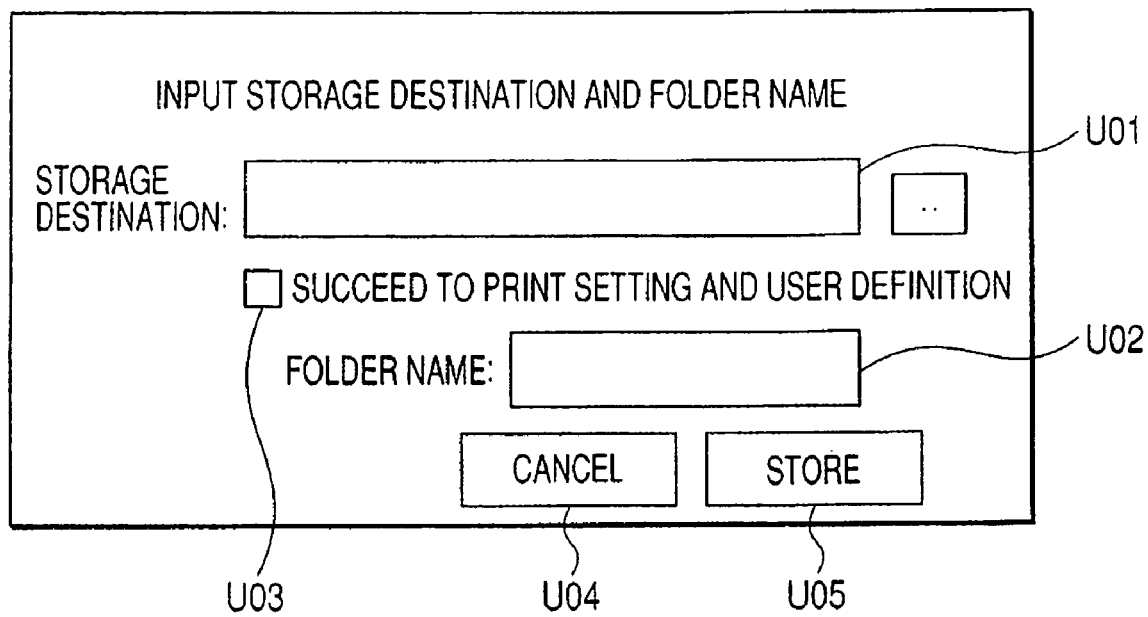
FIG. 5 is a diagram showing an example of a display screen to form a custom installer.

FIG. 4 shows a detailed modification. In FIG. 4, when an icon (displayed on the display T06) of the program developed in T03 of the computer R3 is instructed by using the mouse T05, the execution of this program is started. Processes which are executed by an installer forming program will be described hereinbelow. An initializing process 4-1 is executed, a display screen of FIG. 5 is displayed on the display T06, and the system waits for the input.

The initializing process 4-1 will be explained in detail. First, in the initializing process, a folder added with a predetermined default folder name is formed as a folder to store a customization set which is formed (4-1-2).

The default folder name is displayed in a check box U02 in FIG. 5 and can be edited later by the administrator.

Subsequently, a customization check box is initialized in 4-1-3. In an customization succession initializing process, first, whether or not a setting file of the user defined sheet exists in the HD T07 is confirmed in 4-1-3-2. If the installer forming program determines that such a setting file does not exist, it finishes the initializing process and the processing routine advances to 4-2. If the installer forming program determines in 4-1-3-2 that the setting file of the user defined sheet exists, whether or not user definition favorite registry information has been disclosed in such a file is confirmed in 4-1-3-3. If the installer forming program determines in 4-1-3-3 that the user definition favorite registry information has been disclosed in the file, it finishes the initializing process and the processing routine advances to 4-2. If it is determined that the user definition favorite registry information is not disclosed in the file, a check box U03 showing whether or not the print settings and user settings of the check boxes in FIG. 5 are succeeded to is gray-out displayed in 4-1-3-4, thereby informing that those settings cannot be set.

FIG. 5 shows an example of a display screen to execute the function of forming a custom installer. As shown here, the user can form the set custom installer merely by designating a storage destination and a name and selecting whether or not the print settings (including the print setting, user defined sheet, user defined media, etc.) are succeeded to. In FIG. 5, U01 denotes an edit box for designating a path of the storage destination of the custom installer; U02 the check box to designate the folder name which is formed in the storage destination of the custom installer designated in U01; and U03 the check box to select whether or not the print settings (including the print setting, user defined sheet, user defined media, etc.) are succeeded to. FIG. 11 shows an example of a construction of a module of the custom installer which is formed in this case. The installer in the embodiment includes an installer executing module (installer), a custom installer setting file, and a printer driver.

Figure 6:
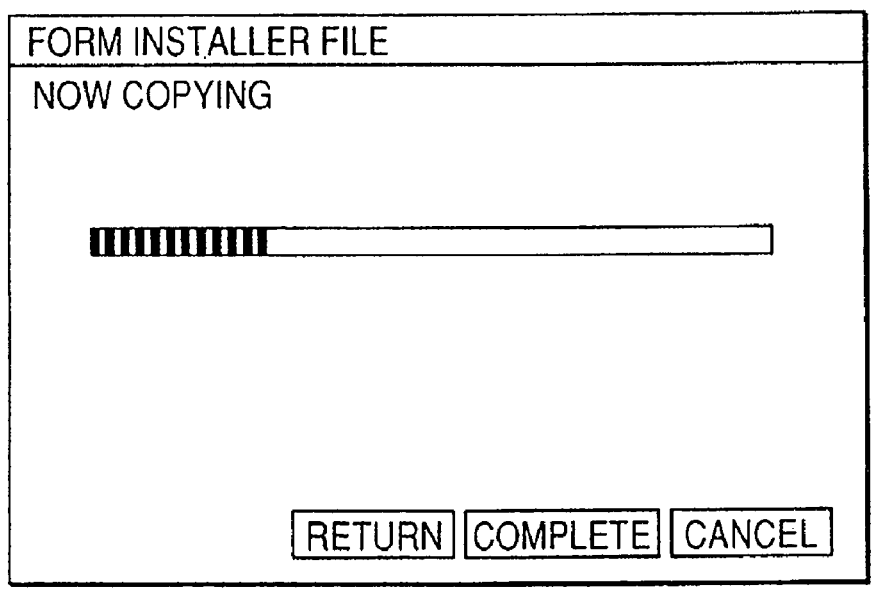
FIG. 6 is a diagram showing a display screen during the process of the installer forming program in the embodiment.
Figure 7:
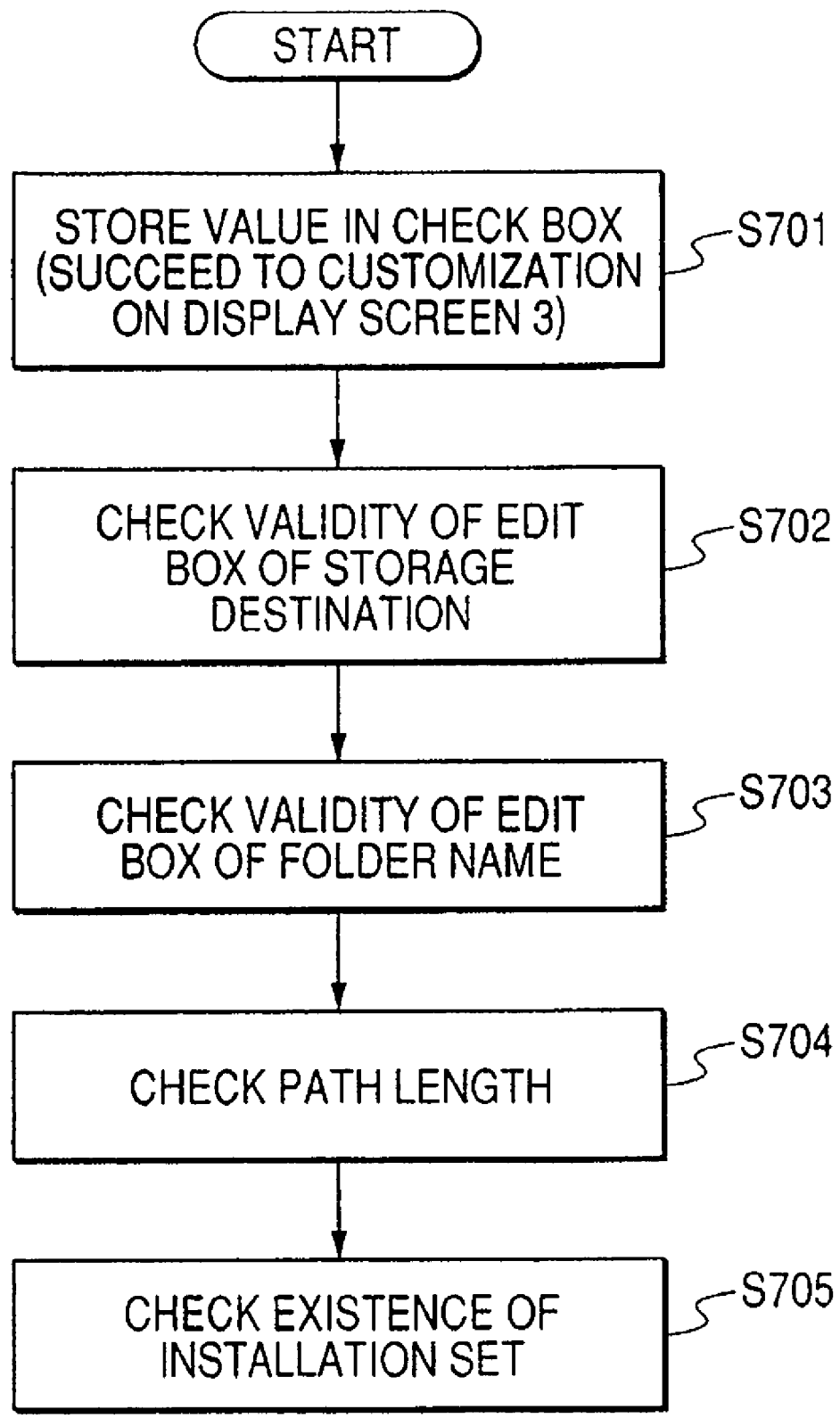
FIG. 7 is a diagram showing an error checking process in the embodiment.

U04 denotes a cancel button. By clicking the cancel button U04, an application is finished. U05 indicates a store button. By clicking the store button, processes of FIG. 7 are started, a display screen shown in FIG. 6 is displayed, and the custom installer is formed. The above processes will be described in detail in FIGS. 7 to 10. It is also possible to construct the system in such a manner that when an error occurs in the processes of FIG. 7, the display screen of FIG. 6 is interrupted or a predetermined error display screen is displayed.

FIG. 7 is a diagram showing an error checking process which is activated when the store button U05 is clicked.

Figure 8:
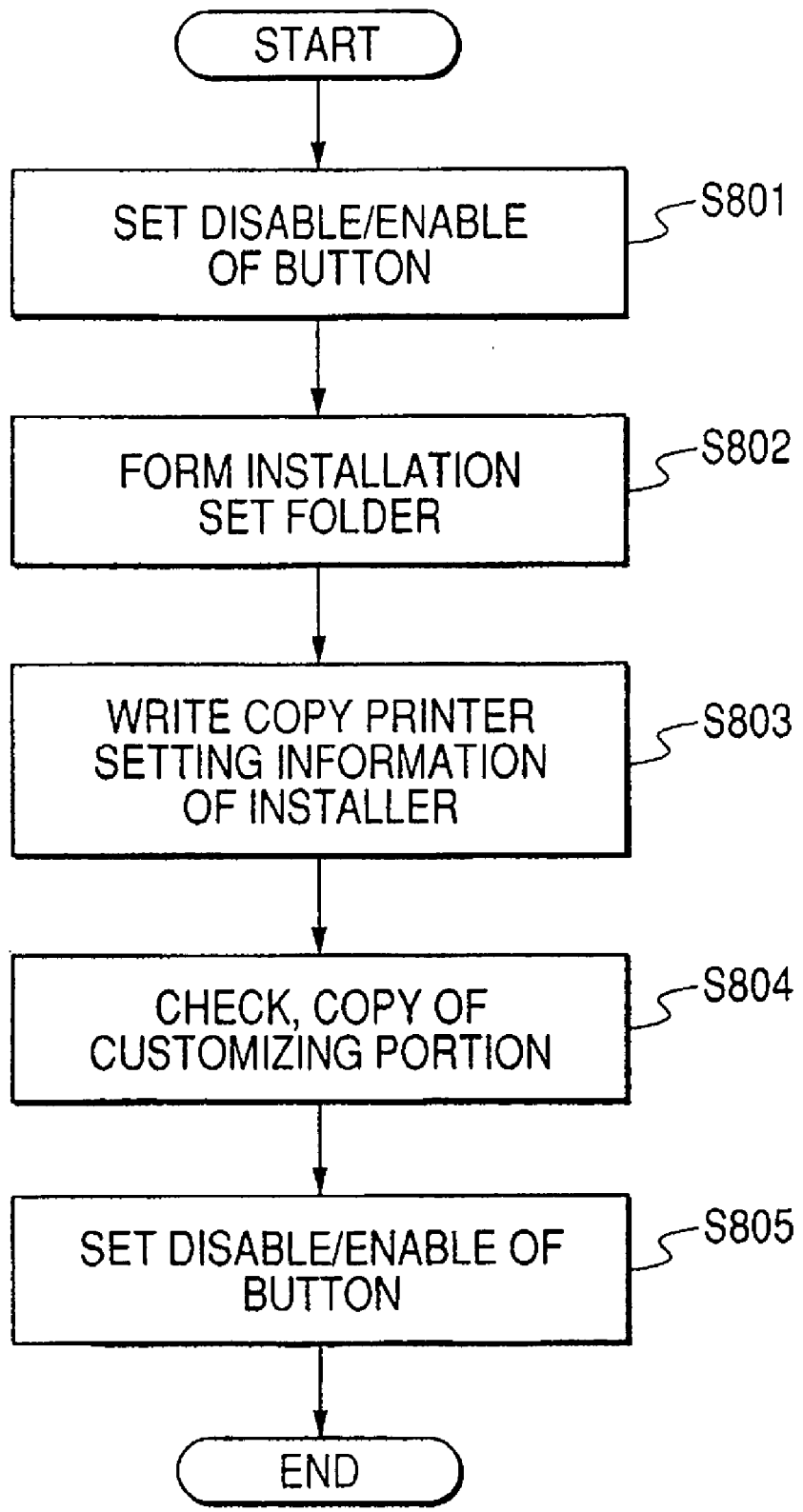
FIG. 8 is a diagram showing an example of the process of the installer forming program in the embodiment.

A value which is determined in accordance with an instruction of the check box is stored in S701. Subsequently, the validity of the edit box of the storage destination is checked in S702. The validity of the edit box of the folder name is checked in S703. A length of path is checked in S704. The existence of the installation set before the customization is checked in S705. In each of the above processing steps, a check result is outputted as a result indicative of truth or falsehood. If there is at least one error in at least one step, the result of falsehood is outputted. If the error occurs, the display of the display screen of FIG. 6 is interrupted, the predetermined error display screen is displayed, and the processing routine is finished. If no errors are detected in the checking steps in FIG. 7, a processing routine shown in FIG. 8 is started. FIG. 8 shows processes which are executed when the display screen of FIG. 6 is displayed. In S801, invalidation (Disable) of the button operation is set so that another process is not erroneously executed during the installing process. An installation set folder is formed in S802. The installer or the like is copied and printer setting information is written in S803. A customizing portion is checked and copied in S804. Subsequently, a process to validate (Enable) the button operation invalidated in S801 is executed in S805.

Figure 15:
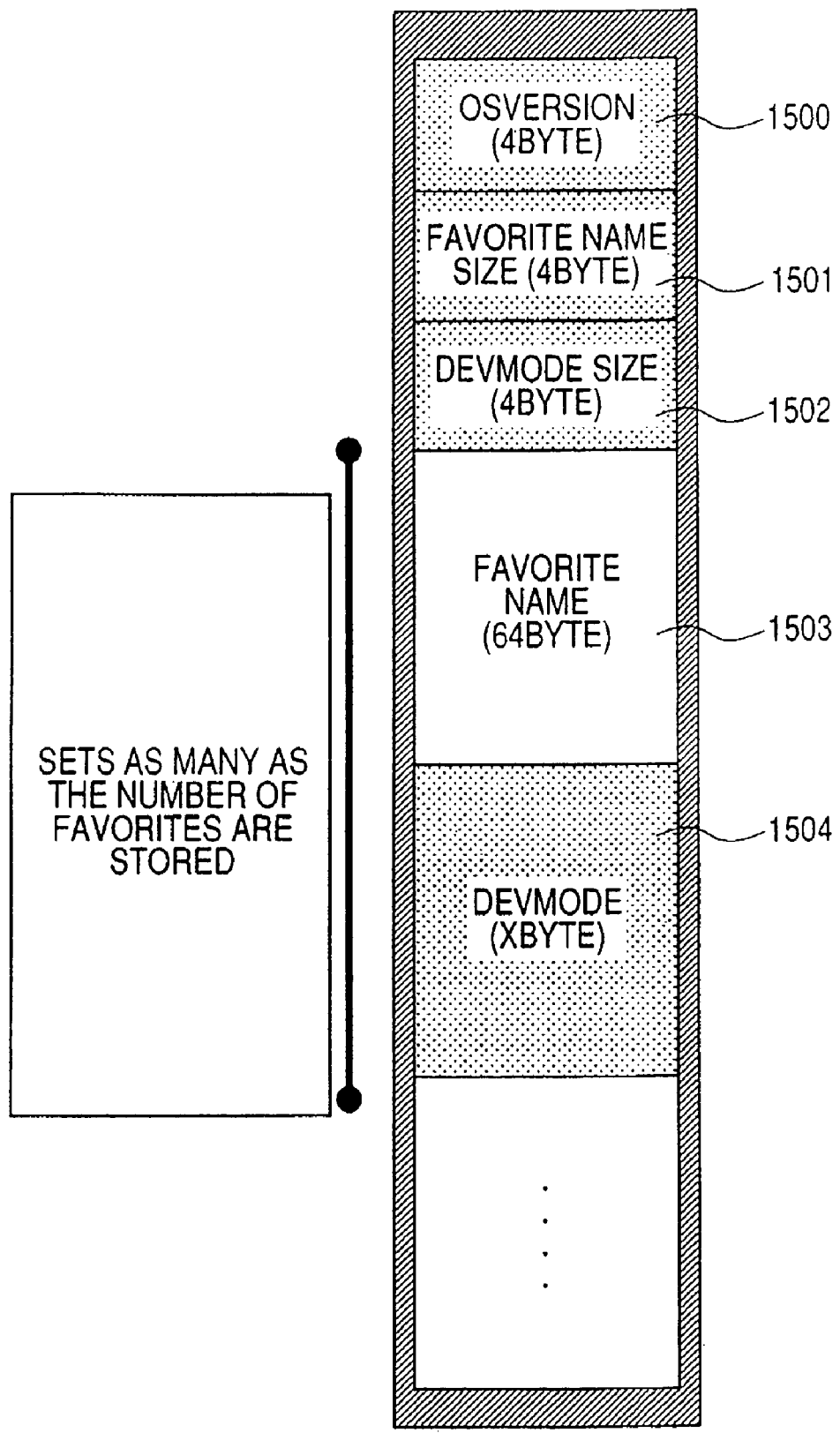
FIG. 15 is a diagram showing an example of a favorite data structure in the embodiment.

A process of S804 as a setting process of the customizing portion will now be described in detail with reference to FIG. 9. The customizing portion is succeeded to in S804. A directory where the driver in which the installation set was held has been stored is obtained in S901. A CIP file is copied (S902). Whether or not the customization is succeeded to is discriminated in S903. That is, whether or not the check box U03 in FIG. 5 has been marked is discriminated. If it is decided that the check box U03 has been marked, the processing routine advances to S904. If it is decided that the check box U03 is not marked, the processing routine is finished. Whether or not the user defined sheet has been customized is discriminated in S904. If it is decided in S904 that the user defined sheet has been customized, S905 follows. If it is decided in S904 that the user defined sheet is not customized, S906 follows. A UDG file is copied in S905 and S906 follows. Whether or not the favorite file has been customized is discriminated in S906. If it is decided in S906 that the favorite file has been customized, S907 follows. If it is decided in S906 that the favorite file is not customized, the processing routine is finished. The favorites are obtained and stored and the setting information is written in S907. Specifically speaking, in S907, the favorite sets are stored in locations 1503 and 1504 in FIG. 15 every DEVMODE in which the favorites have been set by using an SDK. A storing format in this instance is shown in FIG. 15, which will be explained hereinafter. A type of OS to which the favorites correspond has been stored in a location 1500. A size of favorite name has been stored in a location 1501. A total size of DEVMODE regarding the favorites stored in the subsequent location has been stored in a location 1502. The favorite name has been stored in the location 1503. The print setting values to be set as favorites have been stored in the location 1504. The locations 1503 and 1504 are constructed as a set. Data structures similar to those sets as many as the number of favorites are repetitively stored.

Upon installation, the favorite settings 1504 and 1503 are extracted from DEVMODE stored as shown in FIG. 15 and registered into the installed driver by using the SDK, thereby allowing the driver to recognize them. The driver stores and manages the favorites in a registry which is managed by itself and, upon using, loads them into the DEVMODE area.

Figure 10:
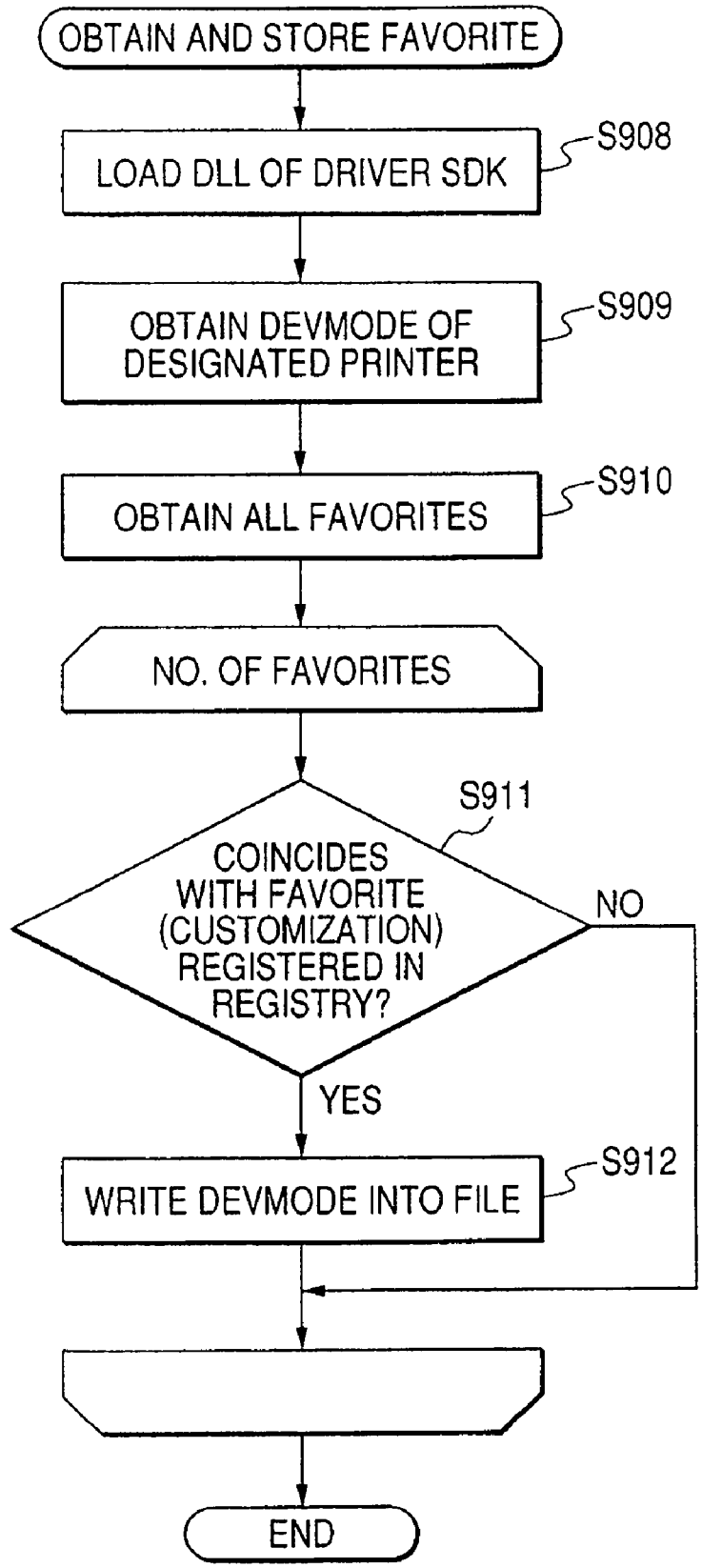
FIG. 10 is a diagram showing an example of the process of the installer forming program in the embodiment.

FIG. 10 is a diagram showing the details of the process of S907. First, a dynamic link library (DLL) of a driver SDK (software developing kit) is loaded in S908. The driver SDK is an application programming interface for allowing the customizing program to obtain DEVMODE serving as a structure of the print settings which are managed by the driver. The customizing program obtains DEVMODE of the designated printer by calling an API of the SDK (S909).

If the favorites which have previously been registered are added by the user, they are registered into the registry. The favorites which have previously been registered have been registered in areas different from the registry. That is, after the favorites were obtained by the SDK in S910, they are checked with those of the registry of the driver of the installation set of the customization target, thereby discriminating in S911 whether the obtained favorites (DEVMODE) are the favorites which have previously been set in the driver or the user defined favorites. If they are the user defined favorites, DEVMODE obtained in S909 is copied into the installation set and a file of FIG. 12 is also formed (S912).

Figure 9:
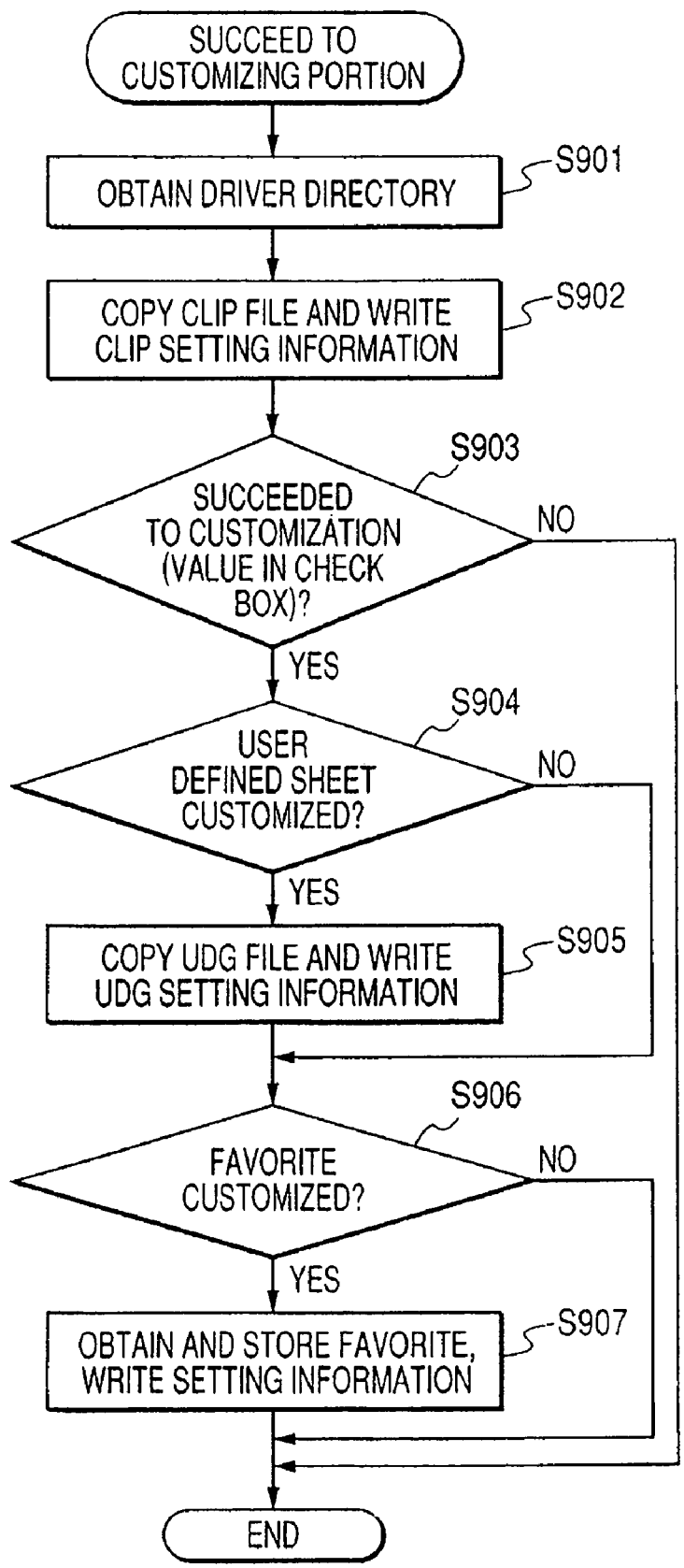
FIG. 9 is a diagram showing an example of the process of the installer forming program in the embodiment.

After the processes were finished with respect to all of the favorites obtained in S910, the processing routine of FIG. 10 is finished and the processing routine of FIG. 9 is also finished.

FIG. 12 shows an example of a setting file for the custom installer (W02). This setting file is a file which is used for the installer forming program to form and write the file as a setting file from the information set into the printer so far. This file is necessary by the custom installer at the time of execution. An IP address, a driver name, a printer name, custom information (+, a file whose name ends with "UDG", a file whose name ends with "CIP", and a file in which the favorites have been stored and whose name ends with "dat"), and the like are written. In the file whose name ends with "UDG", the values defined with respect to the user defined sheet are held. In a customization installer forming environment, it is realized by copying such a file, holding it, and copying it to a predetermined location on the installation destination side. This is because if the user has defined the user definition sheet, since the UDG file exists, it is copied. Therefore, if the sheet is not defined, no files exist and the custom installer does not copy it. Media information has been stored in the CIP file. It is a DB file in which other unique information for printing regarding the media, such as resolution and the like has been stored.

If the driver is installed in this file, the file is copied to a system directory which can be read out by a predetermined driver in a manner similar to other drivers. Therefore, when the user has added new media, such a file has been updated. The custom installer holds such a file and if the default CIP file has already existed on the installation destination side, the file is overwritten.

The custom installer operates in accordance with the setting file. X01 denotes a name of the target printer; X02 an IP address of the installation target printer; X03 a name of the driver to be installed; and X04 information of the stored print settings (including the print setting, user defined sheet, user defined media, etc.). When the custom installation set (as described in FIG. 11, the printer driver, the installer, the file of FIG. 12, the CIP file which is instructed by the file name into the file of FIG. 12 and has been copied in S902, the UDG file copied in S905, the DAT file in which the favorites have been copied in S912, and the like are collected as one package, compressed, and formed as an installation set) formed as mentioned above is executed by another user by using his own computer (for example, R04 in FIG. 2), the set printer driver of the administrator mentioned above is automatically installed merely by executing the custom installer.

Figure 13:
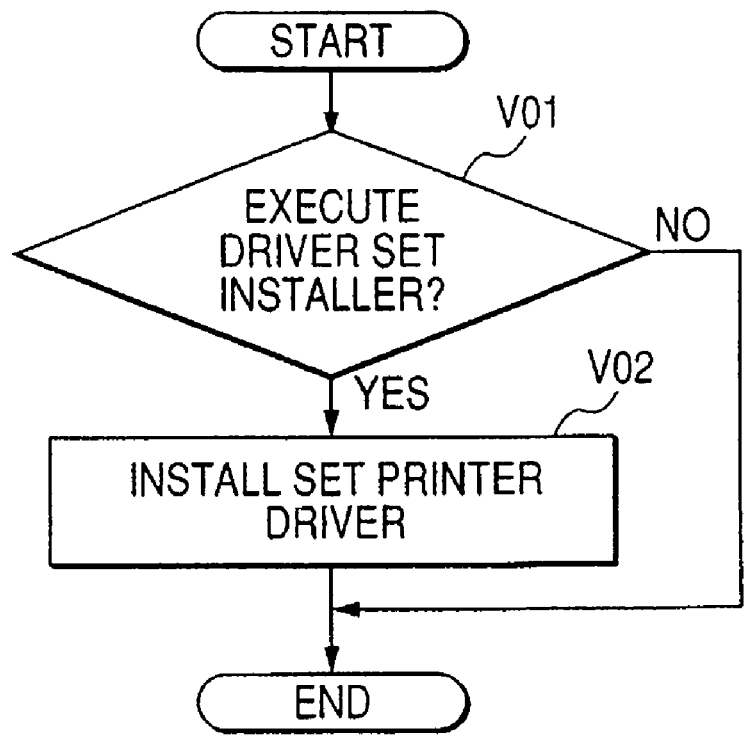
FIG. 13 is a flowchart showing an installing process by the custom installer in a user PC R04.
Figure 14:
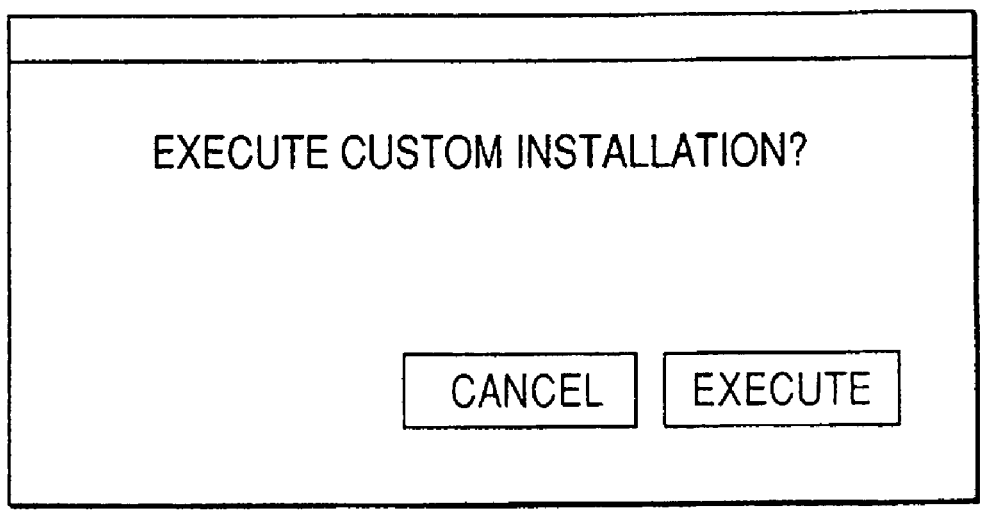
FIG. 14 is a diagram showing a dialog which is displayed when the custom installer is executed.

A flowchart in this case is shown in FIG. 13. When the custom installer is activated, whether or not the customized driver installation is executed is selected in V01. An example of the display screen at this time is shown in FIG. 14. If it is executed, a custom installer executing module (W01) is activated in V02 by using the information (FIG. 12) such as target IP address, driver setting, and the like. The driver installation is executed and the system enters the state where the printer can be used by using the custom driver in the environment of the person who executes.

The computer R03, which has the driver program which has previously been installed, and the installation set including the driver program to be customized and the installer, allows the CPU to execute the installer forming program. The installer forming program obtains the expansion print setting from the print settings set in the driver program which has previously been installed: for example, the favorite print setting which has newly been added separately from the favorites of the driver program which has previously been installed by the user and the setting for specifying the CIP file regarding the user defined sheet.

The installer forming program in the computer R03 writes the obtained expansion print setting into a predetermined area in the installation set.

Further, the following processes are executed in a network system including: the computer R03 having the driver program which has previously been installed, and the installation set including the driver program to be customized and the installer; and the computer R04.

First, in a manner similar to the above, the installer forming application specifies the expansion print setting from the print settings set in the driver program which has previously been installed and obtains the expansion print setting. The obtained expansion print setting is held in a predetermined area in the installation set.

The installation set is transferred from the computer R03 to the computer R04 through the network or conveyed by using a CD-ROM in an off-line manner.

In the computer R04, the installer included in the installation set installs the driver program included in the installation set in response to an executing instruction so that the driver program can recognize the expansion print setting (FIG. 8).

According to the above embodiment, there is such an effect that the management by the server and the use of the information storing area in the printer main body which are necessary in the conventional techniques are unnecessary. There is such an effect that it is also unnecessary to add the function to the printer main body or the driver main body and costs to realize the above construction are low.

(Other Embodiments)

The processes shown in FIGS. 1, 5 to 10, 13, and the like in the embodiment are executed by each apparatus in accordance with the program which is installed from the outside. In this case, the invention is also applied to the case where an information group including the programs is supplied to a host computer by a storing medium such as CD-ROM, flash memory, FD, or the like or from an external storing medium through the network.

Naturally, the objects of the invention are also accomplished by a method whereby a storing medium in which program codes of software to realize the functions of the embodiment mentioned above have been recorded is supplied to a system or an apparatus or downloaded from an external server (not shown) and a computer (or a CPU or an MPU) of the system or the apparatus reads out and executes the program codes stored in the storing medium.

In such a case, the program codes themselves read out of the storing medium realize the novel functions of the invention and the storing medium in which the program codes have been stored constructs the invention. As a storing medium to supply the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only the case where the computer executes the read-out program codes, so that the functions of the embodiment mentioned above are realized but also the case where an OS (operating system) or the like which is operating on the computer executes a part or all of actual processes on the basis of instructions of the program codes and the functions of the embodiment mentioned above are realized by those processes. Further, naturally, the invention also incorporates the case where the program codes read out of the storing medium are written into a memory provided for a function expanding board inserted into the computer or a function expanding unit connected to the computer, thereafter, a CPU or the like provided for the function expanding board or the function expanding unit executes a part or all of actual processes on the basis of instructions of the program codes and the functions of the embodiment mentioned above are realized by those processes.

According to the first aspect of the embodiment, there is such an effect that the print setting expanded after the installation can be succeeded to a new print environment from the printer driver having desired print settings.

According to the second aspect of the embodiment, there is such an effect that the expansion print setting used in the existing print environment, the driver program, and the installer can be made to correspond to each other and constructed as a customized installation set, and a print environment having the expansion print setting can be freely constructed for the user.

This application claims priority from Japanese Patent Application No. 2005-034587 filed on Feb. 10, 2005, which is hereby incorporated by reference herein.

What is claimed is:

1. An information processing apparatus having a customizing application that forms an installation set including a first driver program to be customized and an installer, the first driver program managing a private area and a public area, comprising:
  a specifying unit adapted to specify, under control of the customizing application, expansion print setting, including a content of the expansion print setting and information specifying the expansion print setting, from print settings set in a private area of a second driver program, which is different from the first driver program and which manages the private area and a public area, wherein the expansion print setting is defined by a user;
  an obtaining unit adapted to obtain the expansion print setting specified by said specifying unit, by causing the customizing application to call a predetermined application programming interface for obtaining print setting stored in the private area which is not managed by the customizing application but managed by the second driver program;
  and a holding unit adapted to hold, under control of the customizing application, the expansion print setting obtained by said obtaining unit in the installation set,
  wherein the installer installs the first driver program to another information processing apparatus such that the first driver program recognizes the expansion print setting held in the installation set by said holding unit,
  and wherein said specifying unit specifies favorite print setting, as expansion print setting, which is different from default print setting set in the second driver program and which has been registered after the installation of the second driver program.

2. An apparatus according to claim 1, wherein said specifying unit specifies print setting, as expansion print setting, defined separately from default print setting set in the second driver program.

3. An apparatus according to claim 1, wherein said specifying unit specifies print setting regarding a user defined sheet as expansion print setting.

4. An apparatus according to claim 1, wherein said specifying unit obtains the expansion print setting by using a programming interface which is called from a printer driver, and said holding unit holds the printer driver, as an installation set, in which the obtained expansion print setting has been set.

5. An apparatus according to claim 1, wherein the expansion print setting is stored in a DEVMODE structure.

6. An apparatus according to claim 1, wherein the expansion print setting is (a) print setting which is newly added separately from favorite print setting of a pre-installed driver program, or (b) print setting related to user-defined print sheet.

7. An apparatus according to claim 1, wherein the predetermined application programming interface is a driver SDK.

8. An information processing method in an information processing apparatus having a customizing application that forms an installation set including a first driver program to be customized and an installer, the first driver program managing a private area and a public area, comprising:
  a specifying step of specifying, under control of the customizing application, expansion print setting, including a content of the expansion print setting and information specifying the expansion print setting, from print settings set in a private area of a second driver program, which is different from the first driver program and which manages the private area and a public area, wherein the expansion print setting is defined by a user;
  an obtaining step of obtaining the expansion print setting specified in said specifying step, by causing the customizing application to call a predetermined application programming interface for obtaining print setting stored in the private area which is not managed by the customizing application but managed by the second driver program;
  and a holding step of holding, under control of the customizing application, the expansion print setting obtained in said obtaining step in the installation set,
  wherein the installer installs the first driver program to another information processing apparatus such that the first driver program recognizes the expansion print setting held in the installation set by said holding unit,
  and wherein in said specifying step, favorite print setting which is different from default print setting set in the second driver program and which has been registered after the installation of the second driver program is specified as expansion print setting.

9. A method according to claim 8, wherein in said specifying step, print setting defined separately from default print setting set in the second driver program is specified as expansion print setting.

10. A method according to claim 8, wherein in said specifying step, print setting regarding a user defined sheet is specified as expansion print setting.

11. A method according to claim 8, wherein in said specifying step, the expansion print setting is obtained by using a programming interface which is called from a printer driver, and in said holding step, the printer driver in which the obtained expansion print setting has been set is held as an installation set.

12. A method according to claim 8, wherein the expansion print setting is stored in a DEVMODE structure.

13. A method according to claim 8, wherein the expansion print setting is (a) print setting which is newly added separately from favorite print setting of a pre-installed driver program, or (b) print setting related to user-defined print sheet.

14. A method according to claim 8, wherein the predetermined application programming interface is a driver SDK.

15. An information processing system having a customizing application that forms an installation set including a first driver program to be customized and an installer, the first driver program managing a private area and a public area, comprising:

a specifying unit adapted to specify, under control of the customizing application, expansion print setting, including a content of the expansion print setting and information specifying the expansion print setting, from print settings set in a private area of a second driver program, which is different from the first driver program and which manages the private area and a public area, wherein the expansion print setting is defined by a user;

an obtaining unit adapted to obtain the expansion print setting specified by said specifying unit, by causing the customizing application to call a predetermined application programming interface for obtaining print setting stored in the private area which is not managed by the customizing application but managed by the second driver program;

and a holding unit adapted to hold, under control of the customizing application, the expansion print setting obtained by said obtaining unit into a specific area in the installation set, wherein the installer included in the installation set installs the first driver program included in the installation set to another information processing apparatus in response to an executing instruction so that the first driver program recognizes the expansion print setting, held in the specific area in the installation set by said holding unit, and wherein said specifying unit specifies favorite print setting, as expansion print setting, which is different from default print setting set in the second driver program and which has been registered after the installation of the second driver program.

16. A control program, stored in a computer-readable storage medium, for causing a computer to perform a method carried out in an information processing apparatus having a customizing application that forms an installation set including a first driver program to be customized and an installer, the first driver program managing a private area and a public area, the method comprising:

a specifying step of specifying, under control of the customizing application, expansion print setting, including a content of the expansion print setting and information specifying the expansion print setting, from print settings set in a private area of a second driver program, which is different from the first driver program and which manages the private area and a public area, wherein the expansion print setting is defined by a user;

an obtaining step of obtaining the expansion print setting specified in said specifying step, by causing the customizing application to call a predetermined application programming interface for obtaining print setting stored in the private area which is not managed by the customizing application but managed by the second driver program; and a holding step of holding, under control of the customizing application, the expansion print setting obtained in said obtaining step in the installation set, wherein the installer installs the first driver program to another information processing apparatus such that the first driver program recognizes the expansion print setting held in the installation set by the holding step, and wherein in said specifying step, favorite print setting which is different from default print setting set in the second driver program and which has been registered after the installation of the second driver program is specified as expansion print setting.

* * * * *